(12) United States Patent
Nakakita et al.

(10) Patent No.: US 8,300,282 B2
(45) Date of Patent: *Oct. 30, 2012

(54) IMAGE READING APPARATUS

(75) Inventors: Satoru Nakakita, Nagoya (JP); Yoshinori Osakabe, Seto (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 129 days.

This patent is subject to a terminal disclaimer.

(21) Appl. No.: 12/732,842

(22) Filed: Mar. 26, 2010

(65) Prior Publication Data

US 2010/0245949 A1  Sep. 30, 2010

(30) Foreign Application Priority Data

Mar. 31, 2009 (JP) ................................ 2009-086667
Mar. 31, 2009 (JP) ................................ 2009-086673

(51) Int. Cl.
  *H04N 1/04* (2006.01)
(52) U.S. Cl. ......... 358/474; 358/496; 358/497; 358/498
(58) Field of Classification Search ........................ None
  See application file for complete search history.

(56) References Cited

U.S. PATENT DOCUMENTS

| 5,610,731 | A  | * | 3/1997  | Itoh ............................. | 358/496 |
| 6,707,584 | B1 |   | 3/2004  | Morita |  |
| 7,616,358 | B2 | * | 11/2009 | Su et al. ....................... | 358/498 |
| 7,755,810 | B2 | * | 7/2010  | Kuse ............................. | 358/474 |
| 2003/0038991 | A1 |   | 2/2003 | Yoshida | |
| 2008/0158619 | A1 |   | 7/2008 | Osakabe | |
| 2010/0245950 | A1 | * | 9/2010 | Osakabe ....................... | 358/498 |

FOREIGN PATENT DOCUMENTS

| JP | H10-186535 A | 7/1998 |
| JP | 2001-223832 A | 8/2001 |
| JP | 2002-320075 A | 10/2002 |
| JP | 2003-307787 A | 10/2003 |
| JP | 2004-120220 A | 4/2004 |
| JP | 2005-005752 A | 1/2005 |
| JP | 2005-277774 A | 10/2005 |
| JP | 2006-109371 A | 4/2006 |
| JP | 2007-259209 A | 10/2007 |

OTHER PUBLICATIONS

The State Intellectual Property Office of the People'S Republic of China, Notification of the Second Office Action for Chinese Patent Application No. 201010148881.3 (counterpart Chinese Patent Application), issued Jul. 17, 2012.

* cited by examiner

*Primary Examiner* — Cheukfan Lee
(74) *Attorney, Agent, or Firm* — Baker Botts L.L.P.

(57) ABSTRACT

An image reading apparatus includes an image reading portion that moves in a predetermined direction and has an image reading sensor that reads an image on a sheet. A sheet feeder feeds the sheet. A first transparent member has a reference surface that supports the sheet thereon, and a second transparent member contacts the sheet fed by the sheet feeder. The image reading portion moves along a lower surface of the second transparent member, and the second transparent member is positioned to overlap a portion of the first transparent member as viewed from a direction perpendicular to the reference surface. The image reading portion moves along a lower surface of the first transparent member and moves along a lower surface of the second transparent member.

12 Claims, 10 Drawing Sheets

IMAGE READING APPARATUS

CROSS REFERENCE TO RELATED APPLICATION

The present application claims priority from Japanese Patent Application No. 2009-086667 which was filed on Mar. 31, 2009, and Japanese Patent Application No. 2009-086673 which was filed on Mar. 31, 2009, the disclosures of which are incorporated herein by reference in their entirety.

BACKGROUND OF THE INVENTION

1. Field of the Invention

The present invention relates to an image reading apparatus capable of reading an image of a fixed (stationary) sheet and reading an image of a conveying sheet at a reading position.

2. Description of the Related Art

Conventionally, image reading apparatuses that can, not only read an image of a fixed (stationary) sheet on a transparent glass plate, but also read an image of a conveying sheet, are known. In such an image reading apparatus, a first transparent member for placing the fixed (stationary) sheet and a second transparent member for contacting the conveying sheet are disposed in the same straight line, and a contact image sensor (CIS) mounted on a carriage reads the image of the sheet while moving in contact with lower surfaces of the transparent members.

SUMMARY OF THE INVENTION

In such an image reading apparatus, a gap is formed between the first transparent member and the second transparent member, and from this gap, dust of the sheet that is conveyed drops upon the reading surface of the image scanner disposed therebelow, and adheres thereto. This may produce black streaks or white streaks in an image read by the image scanner.

A need has arisen to provide an image reading apparatus that does not allow dust to fall below the transparent members.

In an embodiment of the invention, an image reading apparatus comprises an image reading portion configured to move in a predetermined direction, the image reading portion comprising an image reading sensor configured to read an image on a sheet, a sheet feeder configured to feed the sheet, a first transparent member having a reference surface configured to support the sheet thereon, and a second transparent member configured to contact the sheet fed by the sheet feeder, the image reading portion moving along a lower surface of the second transparent member, wherein the second transparent member is positioned such that a portion of the second transparent member overlaps a portion of the first transparent member as viewed from a direction perpendicular to the reference surface. The image reading portion is configured to move along a lower surface of the first transparent member and to move along a lower surface of the second transparent member.

Other objects, features, and advantages of embodiments of the present invention will be apparent to persons of ordinary skill in the art from the following description of preferred embodiments with reference to the accompanying drawings.

DESCRIPTION OF THE PREFERRED EMBODIMENTS

Embodiments for carrying out the present invention will hereunder be described with reference to the drawings.

The embodiments of the present invention is applied to an image reading apparatus 2 in a multi-function apparatus having a facsimile function, a scanner function, a copying function and a printer function.

[Basic Structure of Multi-Function Apparatus]

Figure 1:
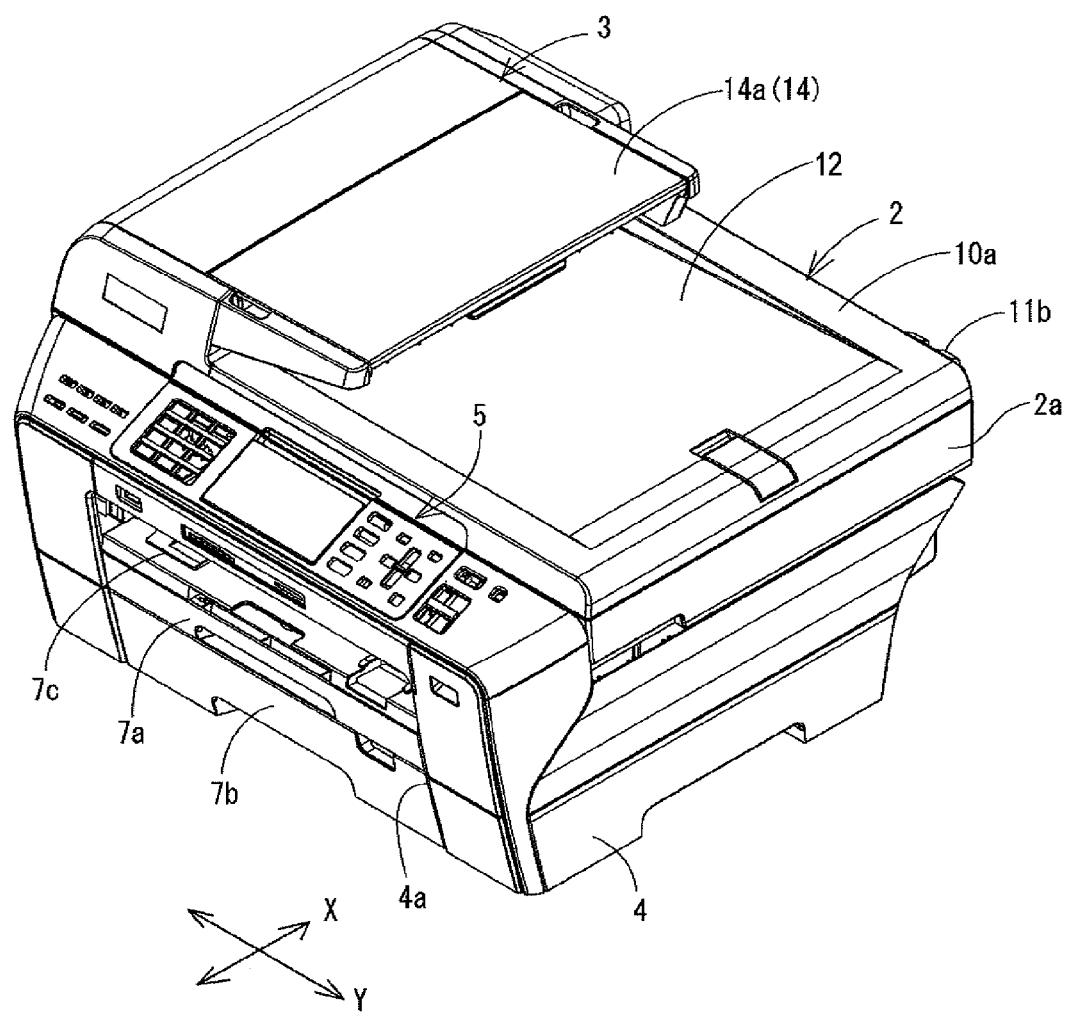
FIG. 1 is a perspective view of a multi-function apparatus including an automatic document feeder and an image reading apparatus according to the present invention.
Figure 2:
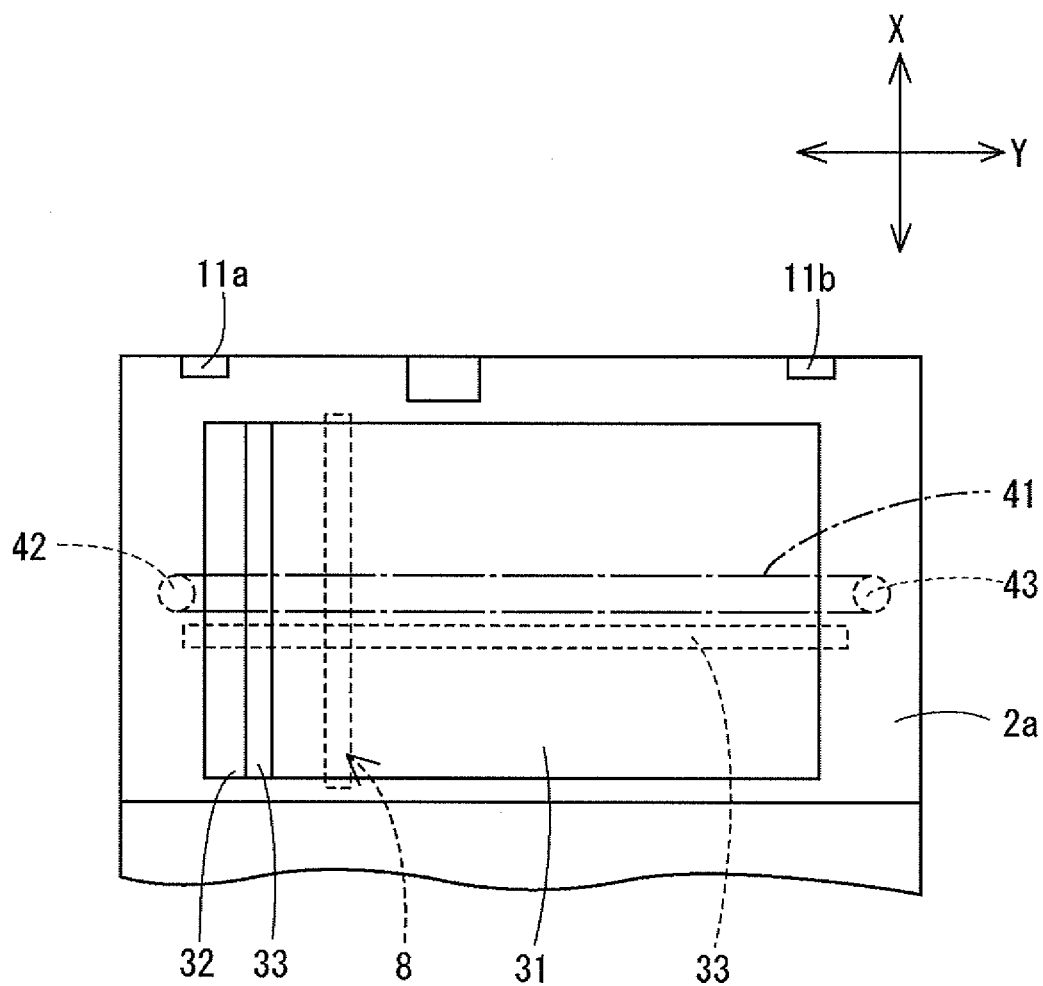
FIG. 2 is a schematic plan view of a conveyance reading section and a fixation reading section.

As shown in FIGS. 1 and 2, an operation panel section 5 is disposed towards the forward portion of the upper surface of a housing 4 of the multi-function apparatus 1. The operation panel section 5 includes, for example, a numeric keypad for executing the facsimile function, the scanner function, or the copying function, button keys for giving instructions for performing various operations, and a liquid crystal panel for performing, for example, an instruction content display or an error display.

As shown in FIG. 1, an opening 4a is formed in the front side (near side in FIG. 1) of the housing 4 of the multi-function apparatus 1. Sheet-feed cassettes 7a and 7b are mounted to the opening 4a at two vertical heights along an X-axis direction so that they can be inserted into and removed from the opening 4a. The sheet-feed cassettes 7a and 7b have an open top and hold sheets in a stacked state. A sheet-discharge tray 7c is mounted to the upper side of the upper sheet-feed cassette 7a. The sheets that are selectively fed from the sheet-feed cassettes 7a and 7b are conveyed to an image recording section (not shown), such as an ink jet type, provided in the housing 4, after which the sheets are discharged to the sheet-discharge tray 7c.

[Image Reading Apparatus and Automatic Document Feeder]

Figure 3:
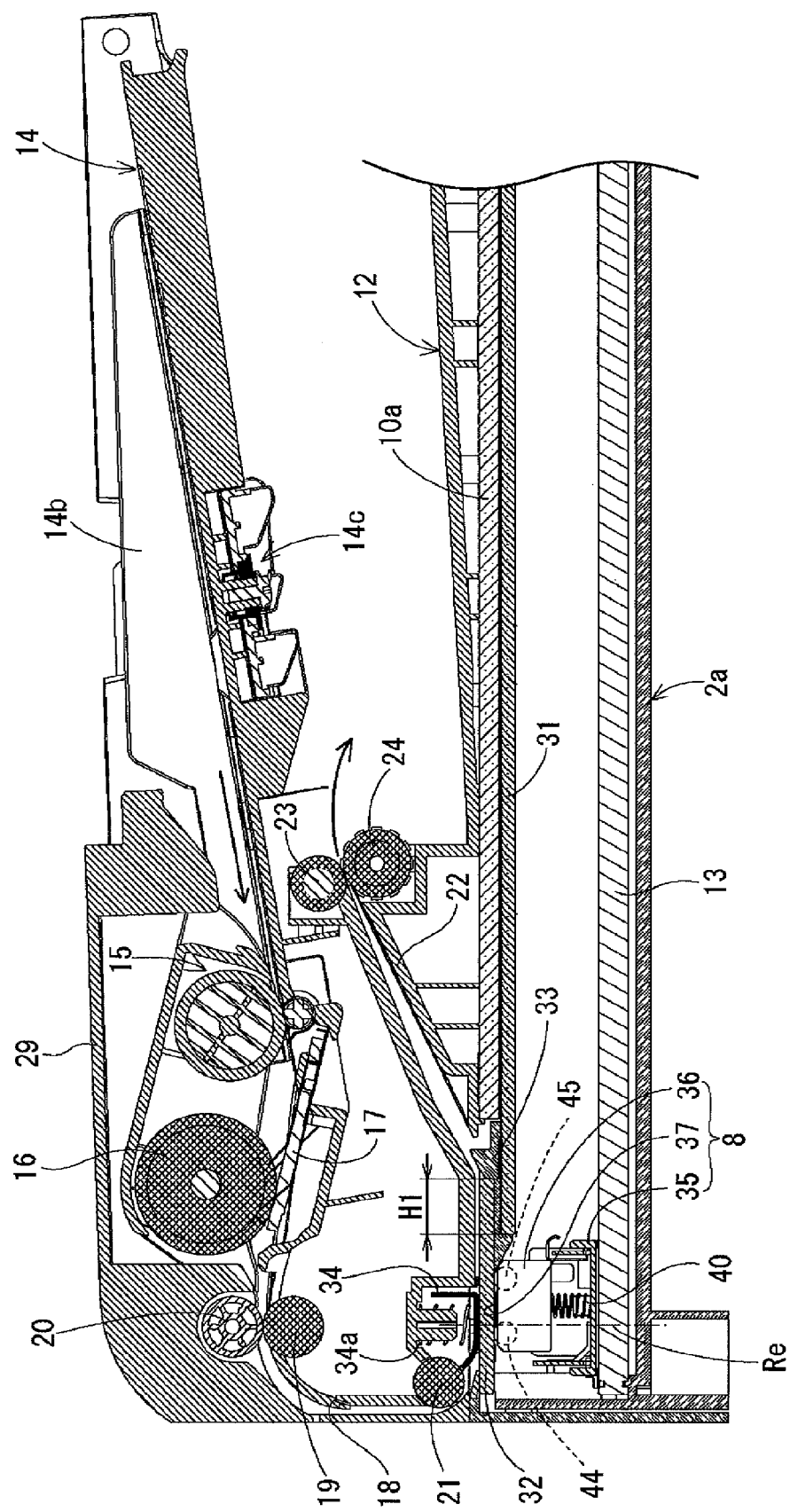
FIG. 3 is a side sectional view of an automatic document feeder and an image reading apparatus.
Figure 4:
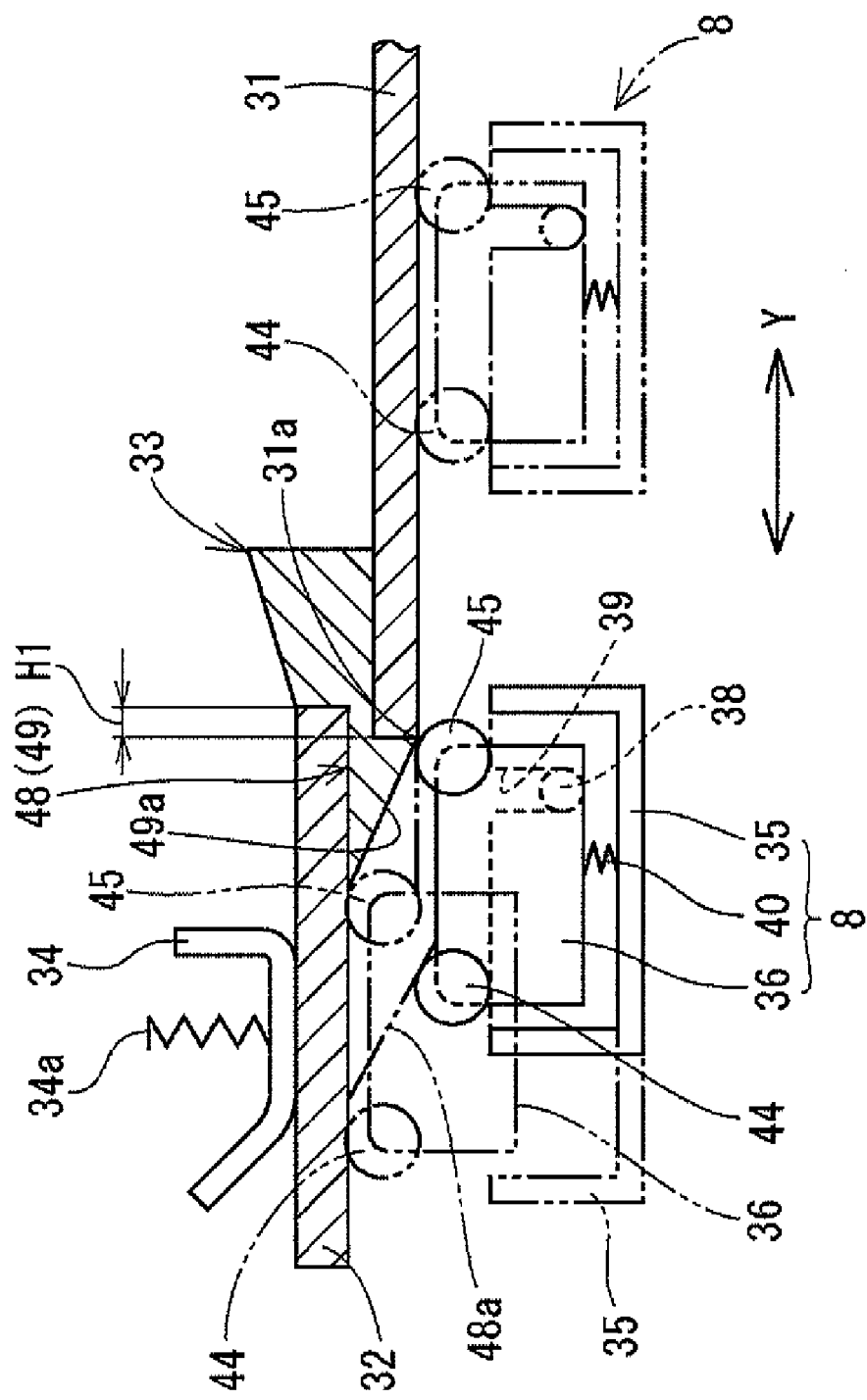
FIG. 4 shows an inclined overlapping portion of a first transparent member and a second transparent member and a side of a first inclined guide surface and a second inclined guide surface according to a first embodiment of the present invention.

The image reading apparatus 2 for executing the scanner function and an automatic document feeder 3 (an example of a "sheet feeder" according to the present invention) mounted thereto are disposed behind the operation panel section 5. As shown in FIGS. 3 and 4 and as described in detail below, at the upper side of a body case 2a of the image reading apparatus 2, a first transparent member 31 (an example of a "first transparent member" according to the present invention) and a second transparent member 32 (an example of a "second transparent member" according to the present invention) are disposed adjacent to each other through a take-up guide member 33. The first transparent member 31 is provided for placing thereon originals at a fixation reading section. The second transparent member 32 is provided for allowing the originals to slidably contact therewith at a conveyance reading section.

The body case 2a of the image reading apparatus 2 is mounted so that one end portion thereof (in the embodiment, the rear side that is separated from a panel cover 5) can rotate vertically around a pivot (not shown) provided horizontally with respect to the housing 4.

The automatic document feeder (ADF) 3 that feeds originals to the image reading apparatus 2 includes an upper cover member 10 that substantially covers the upper side of the body case 2a, the sheet-discharge tray section 12 formed at the upper surface of the upper cover member 10, and a sheet-feed tray section 14 disposed above the sheet-discharge tray 12. A cover member 14a is provided at the sheet-feed tray section 14 so that it can be folded. FIG. 1 shows a state in which the cover member 14a is folded at the sheet-feed tray section 14. When a large original is placed on the sheet-feed tray section 14, the back portion of the original is placed at the back side of the spread cover member 14a. A pressing plate 10a is mounted to the lower surface of the upper cover member 10 (see FIGS. 1 and 3). The pressing plate 10a presses a fixed original whose image recording surface is brought into contact with and is placed on the first transparent member 31. Therefore, the first transparent member 31 corresponds to the fixation reading section.

The upper cover member 10 formed of synthetic resin is mounted to the body case 2a through a pair of hinge means 11a and 11b (see FIG. 2), provided at the back end (the side opposite to the operation panel section 5) of the upper cover member 10, so as to be movable vertically with respect to the body case 2a and so as to be rotatable with respect to the body case 2a so as to be operable and closable. The reason that the pair of hinge means 11a and 11b are movable vertically is that a thick original, such as a book, placed on the first transparent member 31, can be held down by the upper cover member 10 in parallel with the surface of the first transparent member 31.

The automatic document feeder 3 includes a reverse conveying path member 18, which is a substantially U-turn path member, extending in a first conveying direction and a second conveying direction. The first conveying direction is a direction in which an original is conveyed to a reading position Re situated at one side in a Y direction of the sheet-feed tray section 14. The second conveying direction is a direction in which an original is conveyed from the reading position Re to the sheet-discharge tray section 12.

A pair of original guides 14b are provided at the sheet-feed tray section 14. They are formed so that, if one of the original guides 14b is manually moved by a well-known interlocking mechanism 14c, the other original guide 14b is simultaneously moved in an X direction, to make it possible to adjust the wideness in accordance with the width of the original in the X direction.

The automatic document feeder 3 includes a taken-in section, a separation section, and the reverse conveying path member 18. The take-in section takes in a plurality of originals placed in a stacked state on the sheet-feed tray section 14. The separation section separates the originals from the take-in section one at a time to convey the separated originals in the first conveying direction (that is, in the direction in which the sheets approach the reading position Re). The reverse conveying path member 18 reverses the direction of the conveyed sheets in the second conveying direction from the reading position Re and conveys the sheets whose direction has been reversed to the sheet-discharge tray section 12. The take-in section is a pair of take-in rollers 15. A separation roller 16 and a separation pad 17 are disposed downstream from the take-in section in the conveying direction. As shown in FIG. 3, these components are disposed below a cover member 29 that covers the upper side of the left end portion of the automatic document feeder 3.

A feed-in roller section including a first driving roller 19 and a first pinch roller 20 is disposed at the upper end portion of the reverse conveying path member 18 and downstream from the separation section. A second driving roller 21 is disposed at the lower end portion of the reverse conveying path member 18 and upstream from the reading position Re. Further, a discharge roller section including a third driving roller 23 and a third pinch roller 24 is disposed at the upper end (downstream side end) of an upwardly inclined discharge path member 22 and is situated downstream from the reading position Re. Rotational power from one ADF motor (not shown) is transmitted to the take-in rollers 15, the separation roller 16, and the first to third driving rollers 21 to 23 through a gear mechanism (not shown).

[Structure of Image Reading Means]

Linear original reading means 8 (an example of an "image reading portion" according to the present invention) for reading an image recording surface of an original is placed on the linear guide member 13 extending along the Y-axis direction in FIGS. 1 and 2 so that the linear original reading means 8 can reciprocate. The original reading means 8 is linearly formed long in the X-axis direction in FIG. 1.

As shown in FIGS. 2 and 3, the second transparent member 32 whose left area is formed at the left end portion of the first transparent member 31, with the take-up guide member 33 that is adhered to the upper surface of the first transparent member 31 and that is long in the X-axis direction being disposed between the first transparent member 31 and the second transparent member 32. Although, in the embodiment, the first transparent member 31 and the second transparent member 32 are formed of glass plates that are transparent, whose upper and lower surfaces are smooth, and that include parallel surfaces, the first transparent member 31 and the second transparent member 32 may be formed of transparent synthetic resin.

An image reading surface of an original that is conveyed in the first conveying direction along the reverse conveying path member 18 is faced downward. The original slidably contacts the upper surface of the second transparent member 32 to define the reading position Re (see FIG. 4) of the conveying original for reading the image on the original at the original reading means 8 that is stationary at the lower side of the second transparent member 32. An original holder 34 for causing the original to slidably contact the upper surface of the second transparent member 32 is disposed so as to be urged downward by a spring 34a (see FIGS. 3 and 4).

[First Embodiment]

In the embodiment, the original reading means 8 includes a carriage 35 (an example of a "carriage" according to the present invention), a case 36 (an example of a "case" according to the present invention), and an image reading sensor 37 (an example of an "image reading sensor" according to the present invention). The carriage 35 is placed on the round-shaft-like guide member 13 and its orientation is kept constant. The case 36 is disposed in the carriage 35 having an open top. The image reading sensor 37 is secured in the case 36. In the embodiment, the image reading sensor 37 is a contact image sensor (CIS) having a small depth of focus. The case 36 is vertically movably and rotatably disposed at the carriage 35. More specifically, a pair of support shafts 38 extending in the longitudinal direction (X-axis direction) at respective ends of the case 36 are vertically movably and rotatably fitted to guide grooves 39 formed at respective ends of the carriage 35 (in FIG. 5, the support shaft 38 at one end is shown).

If the image reading sensor 37 is a contact image sensor, since its depth of focus is small, it is necessary to dispose the surface of the image reading sensor 37 close to the lower surfaces of the transparent members 31 and 32 and to keep it here. A pair of a first rotating roller 44 (an example of a "sliding member", a "rotating member" according to the present invention) and a second rotating roller 45 (an example of a "sliding member", a "rotating member" according to the present invention) are disposed at the upper side in the X-axis direction at ends of the case 36 (in FIG. 5, the rollers 44 and 45 are shown at one end portion). The first rotating roller 44 and the second rotating roller 45 are disposed so as to be separated from each other as required in both the X-axis direction and the Y-axis direction (see FIGS. 4 to 7). The case 36 is urged upward by urging means, such as a coil spring 40 (an example of an "urging member" according to the present invention), disposed between the bottom plate of the carriage 35 and the lower surface of the case 36. Both ends of the carriage 35 may be slidably supported at guide members (not shown) extending in the Y-axis direction below portions of the body case 2a supporting the side ends of the first transparent member 31 and the second transparent member 32.

A belt 41, such as a timing belt, connected to the carriage 35 is wound upon a drive pulley 42 and a driven pulley 43, disposed at respective ends in the Y-axis direction in the body case 2a, and is rotated by a driving motor (not shown) (see FIG. 2).

One end of the first transparent member 31 at the fixation reading section and one end of the second transparent member 32 at the conveyance reading section are disposed so as to overlap each other at different heights in the thickness direction of both the transparent members 31 and 32. In this case, the second transparent member 32 is disposed with respect to the first transparent member 31 so that the take-up guide member 33 is interposed between the first transparent member 31 and the second transparent member 32.

Both of the transparent members 31 and 32 overlap each other so that the plates of the transparent members 31 and 32 are parallel to each other. They may overlap each other in two ways: (1) the first transparent member 31 is disposed below the second transparent member 32, and the second transparent member 32 is disposed above the first transparent member 31 (FIGS. 3 to 7), and the first transparent member 31 is disposed above the second transparent member 32, and the second transparent member 32 is disposed below the first transparent member 31 (FIG. 8). A dimension H1 of the overlapping portion may be any value. Even if the overlapping portion provided by either of these ways is formed, as a result of disposing the one end of the transparent member 31 and the one end of the transparent member 32 so that they overlap each other without forming a gap between these ends of the transparent members 31 and 32, flexing of the one end of each of the transparent members 31 and 32 is small. In addition, dust does not fall to the lower surfaces of the transparent members 31 and 32, so that a reading surface of the image reading means 8 is not stained and the quality of a reading operation is not reduced. By adhering an abutting portion of each of the transparent members 31 and 32 to the take-up guide member 33 with an adhesive, both of the transparent members 31 and 32 are kept more firmly at their positions with greater strength, which is desirable.

In order to guide an original, which passes along the second transparent member 32 and which is conveyed downstream, towards a sheet-discharge section at the automatic document feeder, the take-up guide member 33, provided at the overlapping portion, has an inclined surface extending upward from the abutting portion of the downward end of the second transparent member 32.

When the carriage 35 passes horizontally along the lower surfaces of the adjacent portions of the first transparent member 31 and the second transparent member 32, in order to prevent the upper surface of the upwardly urged image reading sensor 37 from colliding with a lower corner portion at the one end of the lower transparent member, movement guiding means 46 (an example of a "connecting member" according to the present invention) is provided.

Figure 5:
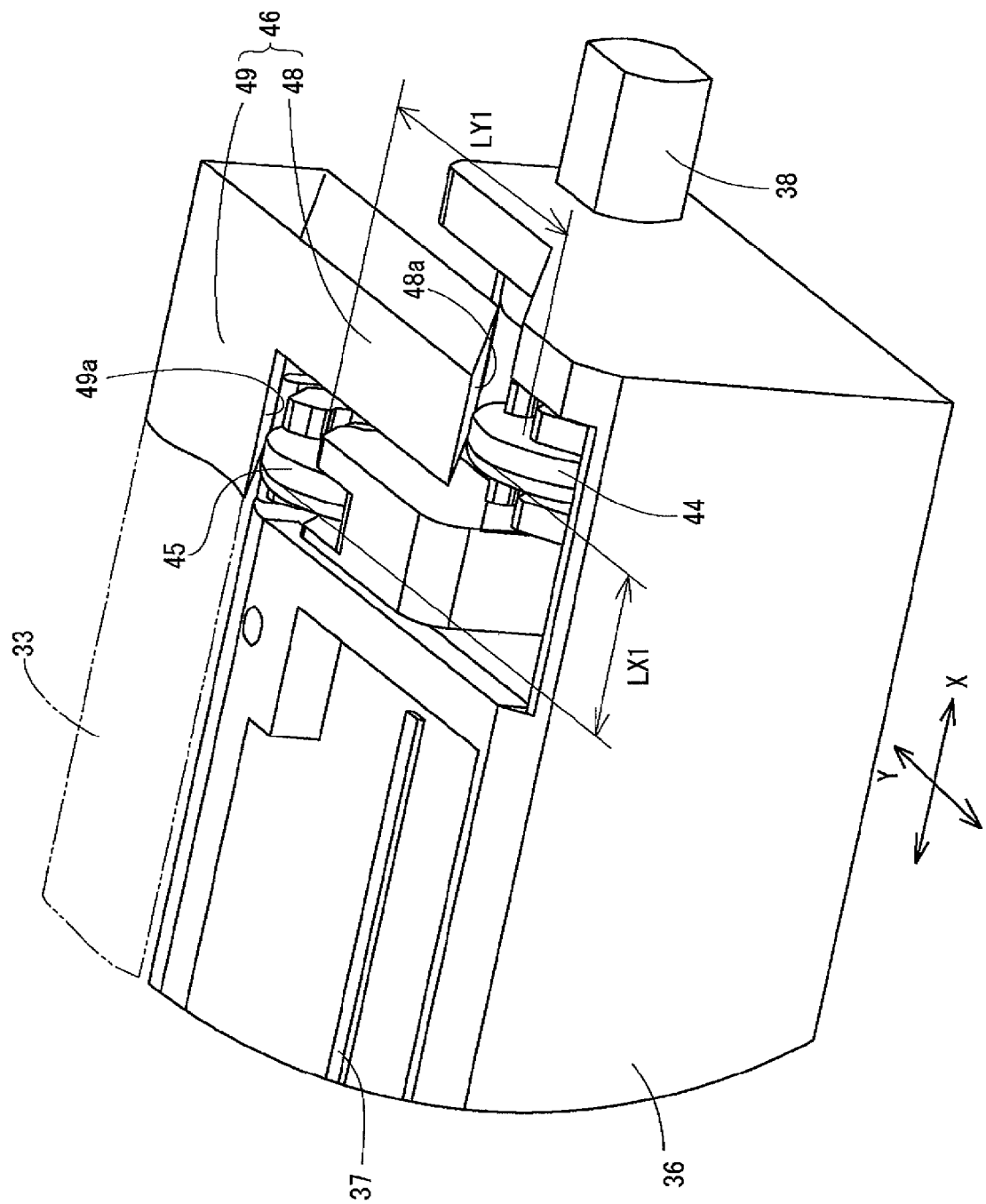
FIG. 5 is an enlarged perspective view of the main portion, showing the relationship between the positions of a pair of rotating rollers, a first guide member, and a second guide member at one side of a case.

FIGS. 4 and 5 show a first embodiment of the movement guiding means 46 when the first transparent member 31 is disposed below the second transparent member 32. That is, a pair of guide members 48 and 49 having respective guide inclined surfaces 48a and 49a (an example of a "guiding surface", an "inclined surface" according to the present invention) for guiding the pair of rotating rollers 44 and 45 are provided at a passing portion where the carriage 35 passes in the movement direction the adjacent portions of the one end of the first transparent member 31 and the one end of the second transparent member 32. In this case, since the pair of first rotating roller 44 and second rotating roller 45 are provided at the case 36 at outer portions of ends in the X-axis direction of the image reading sensor 37, the pair of guide members 48 and 49 are also provided at locations corresponding to the locations of the rotating rollers 44 and 45, and are not provided at locations corresponding to the surface (upper surface) of the image reading sensor 37.

The first rotating roller 44 and the second rotating roller 45 are disposed apart from each other by a distance (LX1) in the X-axis direction, and by a distance (LY1) in the Y-axis direction. Therefore, the first guide inclined surface 48a of the first the first guide member 48 corresponding to the first rotating roller 44 and the second guide inclined surface 49a of the second guide member 49 corresponding to the second rotating roller 45 are disposed apart from each other as required in both the X-axis direction and the Y-axis direction (see FIGS. 4 and 5).

Further, for example, when the carriage 35 moves in a direction in which it passes from the first transparent member 31 disposed below the second transparent member 32 to the second transparent member 32, in side projection view, the lower surface of the first guide member 48 is formed flush with the lower surface of the first transparent member 31 up to an appropriate downstream side at which the location corresponding to a lower-surface-side corner 31a at the one end of the first transparent member 31 is passed. In continuation with this, the first guide inclined surface 48a is formed so as to contact the lower surface of the second transparent member 32 (see alternate long and two short dash line in FIG. 4). In the same side projection view, from a location corresponding to that of the lower-surface-side corner 31a at the one end of the first transparent member 31 or from a nearest downstream-side position beyond the location of the lower-surface-side corner 31a, the second guide member 49 is linearly formed so that the second guide inclined surface 49a contacts the lower surface of the second transparent member 32. In the first embodiment, the first guide inclined surface 48a and the second guide inclined surface 49a are linearly and parallel formed.

According to this structure, while the first rotating roller 44 passes beyond the one end portion of the first transparent member 31 and passes along the lower surface of the second transparent member 32 formed flush with the lower surface of the first transparent member 31 and the subsequent first guide inclined surface 48a, the second rotating roller 45 slidably contacts the lower surface of the first transparent member 31. Therefore, the carriage 35 can move so that the upper surface of the image reading sensor 37 disposed between both rotating rollers 44 and 45 does not collide with the lower-surface-side corner 31a at the one end of the first transparent member 31 disposed below the second transparent member 32 (see alternate long and two short dash line and solid line in FIG. 4). Even if the carriage 35, positioned at the lower-surface side of the second transparent member 32, is moved towards the lower surface of the first transparent member 31, similarly, the upper surface of the image reading sensor 37 does not collide with the lower-surface-side corner 31a at the one end of the first transparent member 31 disposed below the second transparent member 32. As a result, noticeable advantages are achieved in that the reading portion corresponding to the upper surface of the image reading sensor 37 is not scratched, and in that the quality of a reading operation is not deteriorated.

If the carriage 35 is moved until both of the rotating rollers 44 and 45 slidably contact the lower surface of the second transparent member 32, the upper surface of the image reading sensor 37 is located adjacent to and is parallel with the lower surface of the second transparent member 32.

[Second Embodiment]

Figure 6:
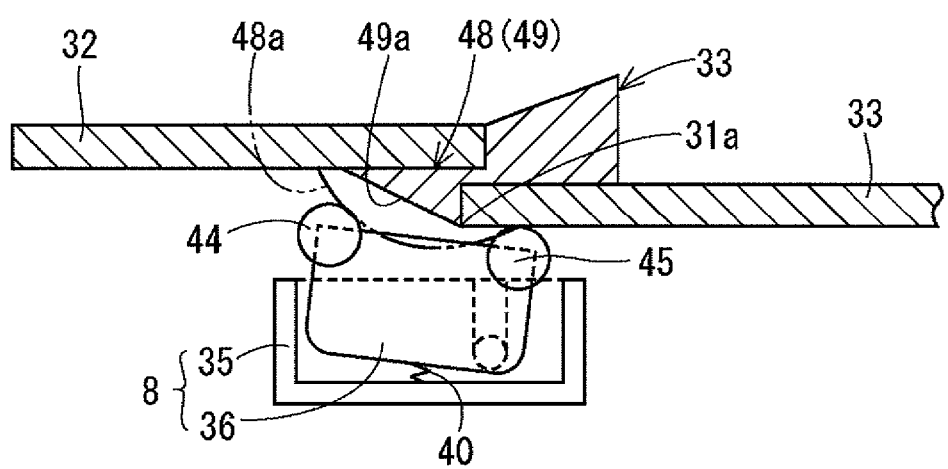
FIG. 6 shows an inclined overlapping portion of a first transparent member and a second transparent member and a side of a first inclined guide surface and a second inclined guide surface according to a second embodiment of the present invention.

In the second embodiment shown in FIG. 6, in side projection view, a first guide inclined surface 48a at the lower side of the first guide member 48 is such that its leading end portion starts from the upstream side in the movement direction of a carriage 35 with respect to the location corresponding to that of a lower-surface-side corner 31a at the one end of the first transparent member 31, and is such that it is formed in a protruding curved shape below the lower surface of the first transparent member 31 up to an appropriate downstream side beyond the location of the lower-surface-side corner 31a at the one end of the first transparent member 31. Further, in continuation with this, the first guide inclined surface 48a is formed so as to contact the lower surface of the second transparent member 32 (see alternate long and two short dash line in FIG. 6). From a location corresponding to that of the lower-surface-side corner 31a at the one end of the first transparent member 31 or from a nearest downstream-side position beyond the location of the lower-surface-side corner 31a, a second guide inclined surface 49a of a second guide member 49 is linearly formed so as to contact the lower surface of the second transparent member 32 similarly in side projection view.

Even in the second embodiment, even if the carriage 35 reciprocates along the Y-axis direction by passing the lower side of the overlapping portion of the first transparent member 31 and the second transparent member 32, the upper surface of an upwardly urged image reading sensor 37 does not collide with the lower-surface-side corner 31a at the one end of the lower first transparent member 31.

[Third Embodiment]

In the third embodiment shown in FIG. 8, the second transparent member 32 is disposed so as to be below, so as to be parallel with, and so as to partially overlap the lower surface of the first transparent member 31. In this case, in side projection view, the first guide inclined surface 48a of the first guide member 48 (provided in correspondence with the first rotating roller 44) is such that its leading end portion starts from the upstream side in the movement direction of the carriage 35 with respect to the overlapping portion of both of the transparent members 31 and 32, and is such that it is formed in a protruding curved shape below the lower surfaces of both the first transparent member 31 and the second transparent member 32 up to an appropriate downstream side beyond a lower-surface-side corner 32a at one end of the second transparent member 32 (see alternate long and short dash line in FIG. 8). Further, similarly, in side projection view, the second guide inclined surface 49a of the second guide member 49 disposed in correspondence with the second rotating roller 45 is linearly formed so as to extend downward towards the lower-surface-side corner 32a at the one end of the second transparent member 32 from the lower surface of the first transparent member 31 (see solid line in FIG. 8).

Even in the third embodiment, even if the carriage 35 reciprocates along the Y-axis direction by passing the lower surface of the first transparent member 31 and the lower surface of the second transparent member 32, the upper surface of the upwardly urged image reading sensor 37 does not collide with the lower-surface-side corner 32a at the one end of the lower second transparent member 32. Accordingly, even in this embodiment, the upper surface of the image reading sensor 37 is not rubbed against and scratched by the nearby transparent member, and the quality of a reading operation is not deteriorated.

When the second transparent member 32 is set high overlaps the upper surface of the first transparent member 31 from above the first transparent member 31, at the conveyance reading section, the second transparent member 32 is disposed above the first transparent member 31 and the inclination angle of the upwardly oriented inclined surface of the take-up guide member 33 for guiding an original to the discharge path member 22 can be made smaller than that when the first transparent member 31 and the second transparent member 32 are flush with each other. As a result, upward pulling of an original passing a reading section Re is reduced, thereby preventing the original from becoming raised from the upper surface of the second transparent member 32, so that the quality of a reading operation is ensured.

When the second transparent member 32 is set high overlaps the lower surface of the first transparent member 31 from below the first transparent member 31, the end of the second transparent member 32 can be overlapped larger in size with respect to the end of the first transparent member 31. As a result, it is possible to set the reading section Re of a conveying original at the second transparent member 32 close to the one end of the first conveying member 31, so that the size of the image reading apparatus 2 in the Y-axis direction can be reduced.

Figure 7:
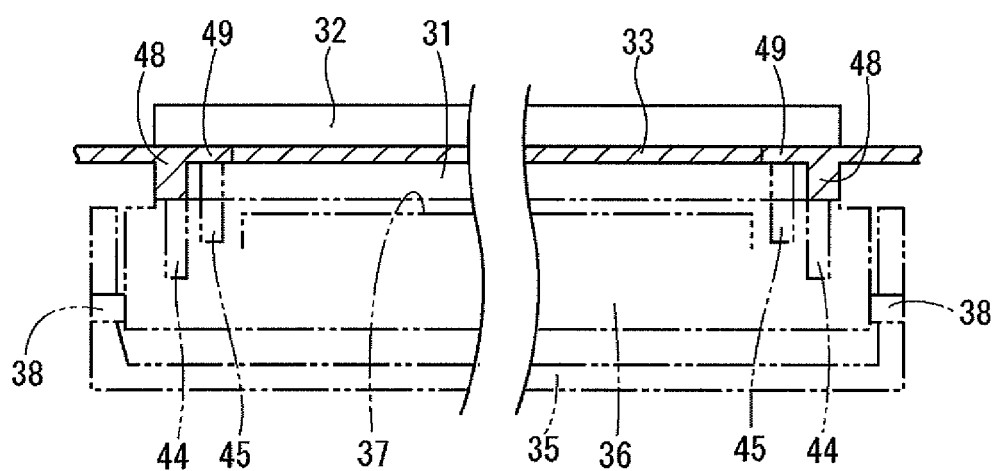
FIG. 7 is a schematic sectional view showing the relationship between the positions of a pair of rotating rollers, a first guide member, and a second guide member.
Figure 8:
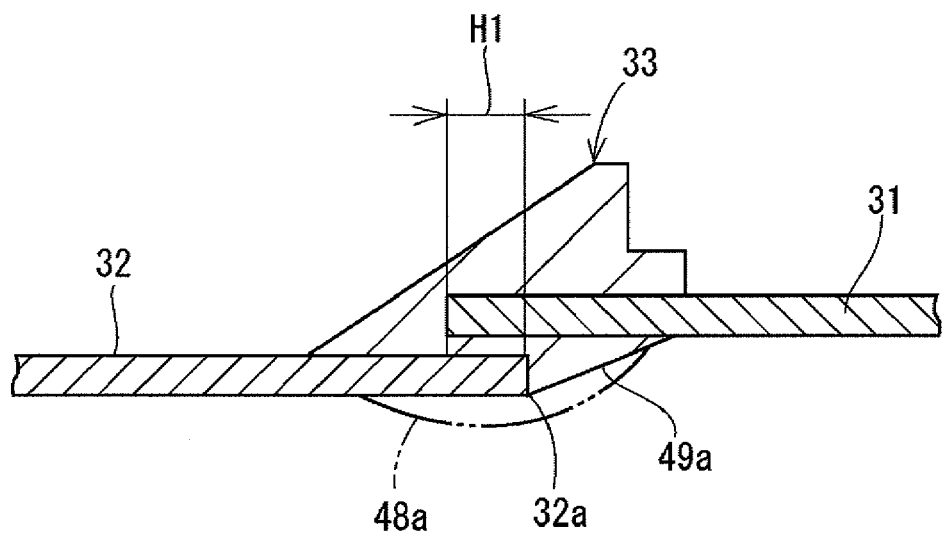
FIG. 8 shows an inclined overlapping portion of a first transparent member and a second transparent member and a side of a first inclined guide surface and a second inclined guide surface according to a third embodiment of the present invention.

A plurality of the first guide members 48 and the second guide members 49 may be formed adjacent to respective ends in the X-axis direction of the take-up guide member 33, and integral with the take-up guide member 33 (see FIG. 7). In another embodiment, a first guide member 48 and a second guide member 49 can be formed integrally with lower-surface sides of support portions at side edges of a first transparent member 31 and a second transparent member 32 at the upper plate side of a body case 2a. Alternatively, the first guide member 48 and the second guide member 49 that are separate members may be secured to the lower-surface sides of the upper plate of the body case 2a with, for example, an adhesive, for example, a double-faced adhesive tape.

Instead of the rotating rollers 44 and 45, a pair of sliding members may be formed by members in which portions thereof that do not rotate and that include protruding curved surfaces have small friction coefficients.

[Fourth Embodiment]

Figure 9:
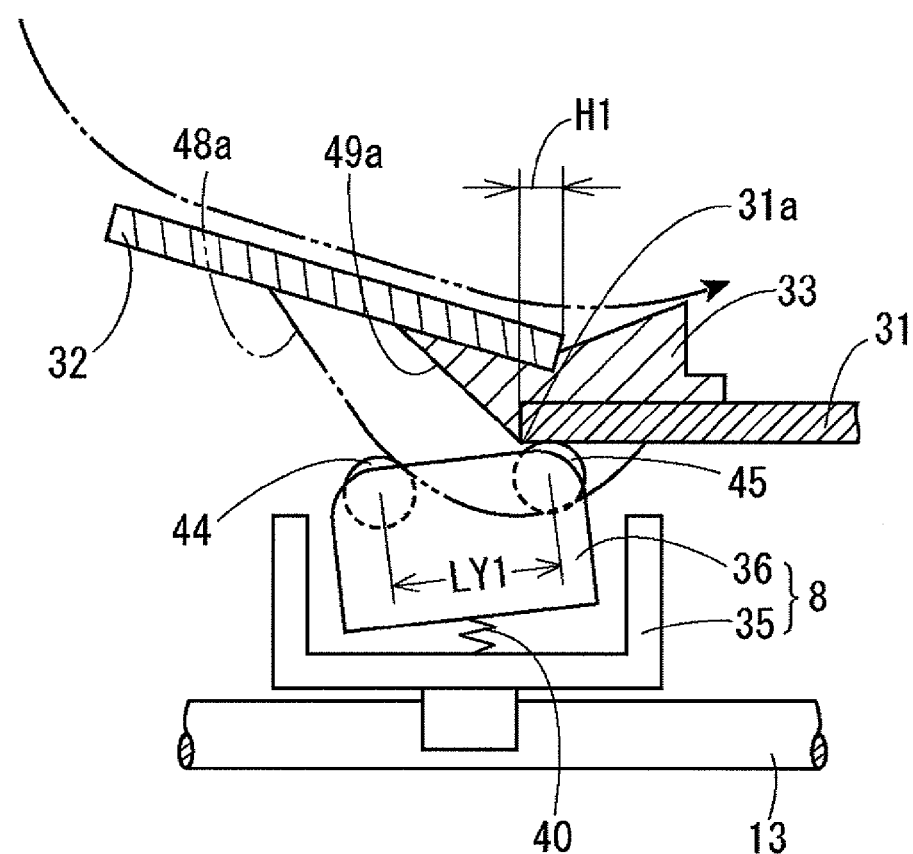
FIG. 9 is an enlarged sectional view of the main portion according to a fourth embodiment of the present invention.

As shown in FIG. 9, the second transparent member 32 may be inclined and disposed with respect to a horizontally disposed first transparent member 31 so that the upstream-side in the conveying direction of the second transparent member 32 is higher than a portion (downstream side) of the second transparent member 32 that is adjacent to the first transparent member 31, and may be disposed so that the lower end of the second transparent member 32 overlaps the upper side of one end of the first transparent member 31 by an appropriate dimension H1.

[Fifth Embodiment]

Figure 10:
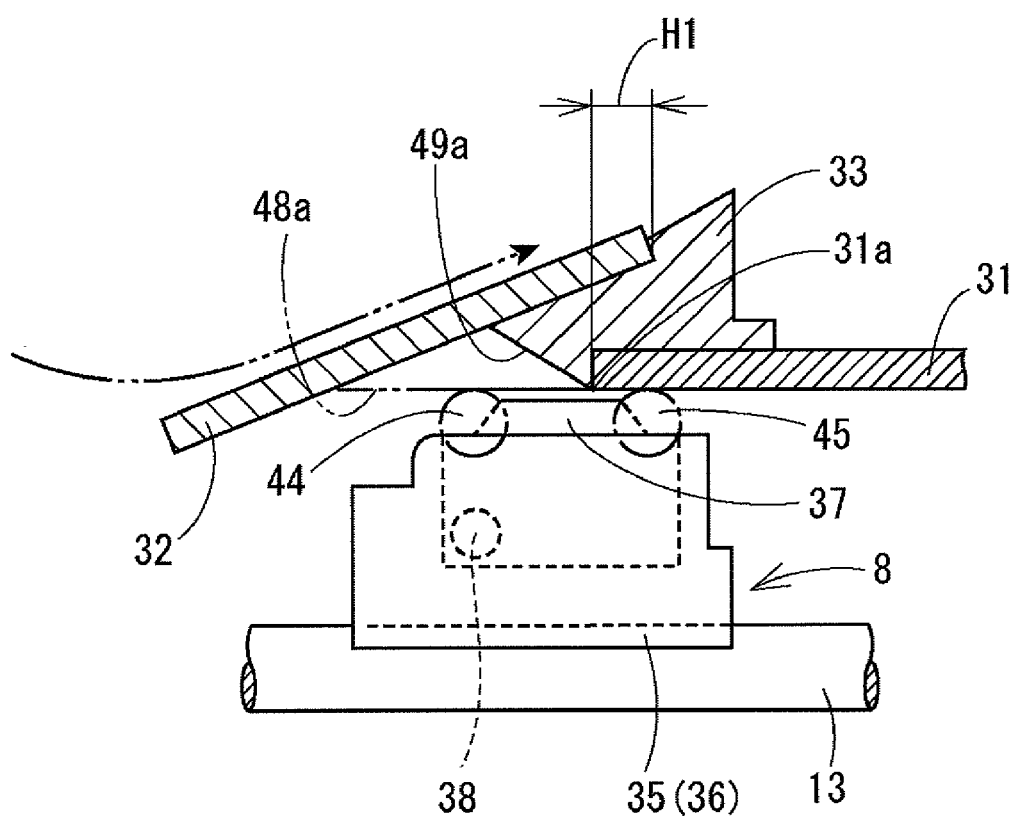
FIG. 10 shows an inclined overlapping portion of a first transparent member and a second transparent member and a side of a first inclined guide surface and a second inclined guide surface according to a fifth embodiment of the present invention.

As shown in FIG. 10, one end (downstream-side end) of a second transparent member 32 may be inclined and disposed so that its upstream side in the conveying direction is at a low position and its downstream side in the conveying direction is at a high position, and may be disposed above one end of the first transparent member 31 so that one end of the second transparent member 32 and the one end of the first transparent member 31 at different heights in the thickness direction of both of the transparent members 31 and 32 overlap each other by a dimension H1.

If the image reading sensor 37 is a charged coupled device (CCD), since its depth of focus is large, it is unnecessary to dispose the surface of the image reading sensor 37 close to the lower surfaces of the transparent members 31 and 32 and to keep it here. Therefore, the upper surface of the image reading sensor 37 can be moved in parallel below the lower surface of the first transparent member 31 or the second transparent member 32. As a result, the rotating rollers 44 and 45 and the first guide member 48 and the second guide member 49 are unnecessary.

Accordingly, by disposing the one end of the second transparent member 32 at the conveyance reading section so as to overlap the one end of the first transparent member 31 at the fixation reading section at different heights in the thickness direction of both of the transparent members 31 and 32, dust does not fall below the transparent members, and a gap, which is formed continuously with the transparent members in the thickness direction, is not formed between the fixation reading section and the conveyance reading section. As a result, static electricity generated above the transparent members when an original passes or is placed on the transparent members do not reach locations below the transparent members, so that measures against static electricity of CIS can be taken; the supporting strength of the transparent members can be increased; and the size of the image reading apparatus can be reduced.

In the embodiments, in order to urge the case 36 upward, an urging member is used, but a plurality of urging members may be used. Moreover, the urging member may not be used and a guide of the carriage 35 may be set in parallel with the first transparent member 31 and the second transparent member 32.

What is claimed is:

1. An image reading apparatus comprising:
an image reading portion configured to move in a predetermined direction, the image reading portion comprising an image reading sensor configured to read an image on a sheet;
a sheet feeder configured to feed the sheet;
a first transparent member having a reference surface configured to support the sheet thereon; and
a second transparent member configured to contact the sheet fed by the sheet feeder, the image reading portion moving along a lower surface of the second transparent member, wherein the second transparent member is positioned such that a portion of the second transparent member overlaps a portion of the first transparent member as viewed from a direction perpendicular to the reference surface, and such that the image reading portion reads the image on the sheet at a first position through the first transparent member, not through the second transparent member; and reads the image on the sheet at a second position through the second transparent member, not through the first transparent member,
wherein the image reading portion is configured to move along a lower surface of the first transparent member and to move along a lower surface of the second transparent member.

2. The image reading apparatus according to claim 1, wherein the second transparent member is parallel to the reference surface.

3. The image reading apparatus according to claim 1, wherein the image reading sensor is a contact image sensor.

4. The image reading apparatus according to claim 1, further comprising a case of the image reading portion, and wherein the image reading portion comprises a carriage configured to support the case, the carriage extends in a direction perpendicular to the predetermined direction, and the carriage is configured to reciprocate in the predetermined direction and a direction opposite to the predetermined direction.

5. The image reading apparatus according to claim 4, wherein the image reading portion further comprises an urging member positioned between the carriage and the case and configured to urge the case in a direction away from a bottom surface of the carriage.

6. An image reading apparatus comprising:
an image reading portion configured to move in a predetermined direction, the image reading portion comprising an image reading sensor configured to read an image on a sheet;
a sheet feeder configured to feed the sheet;
a first transparent member having a reference surface configured to support the sheet thereon; and
a second transparent member configured to contact the sheet fed by the sheet feeder, the image reading portion moving along a lower surface of the second transparent member, wherein the second transparent member is positioned such that a portion of the second transparent member overlaps a portion of the first transparent member as viewed from a direction perpendicular to the reference surface,
wherein the image reading portion is configured to move along a lower surface of the first transparent member and to move along a lower surface of the second transparent member, and
wherein the image reading portion is configured to slide along and contact the lower surface of the first transparent member and the lower surface of the second transparent member.

7. An image reading apparatus comprising:
an image reading portion configured to move in a predetermined direction, the image reading portion comprising an image reading sensor configured to read an image on a sheet;
a sheet feeder configured to feed the sheet;
a first transparent member having a reference surface configured to support the sheet thereon;
a second transparent member configured to contact the sheet fed by the sheet feeder, the image reading portion moving along a lower surface of the second transparent member, wherein the second transparent member is positioned such that a portion of the second transparent member overlaps a portion of the first transparent member as viewed from a direction perpendicular to the reference surface,
wherein the image reading portion is configured to move along a lower surface of the first transparent member and to move along a lower surface of the second transparent member; and
a connecting member configured to connect the first transparent member to the second transparent member, wherein the image reading portion is configured to selectively move between the lower surface of the first transparent member and the lower surface of the second transparent member via the connecting member.

8. The image reading apparatus according to claim 7, wherein
the image reading portion further comprises at least one sliding portion; and
the connecting member comprises a guiding surface configured to guide the at least one sliding portion.

9. The image reading apparatus according to claim 8, wherein
the at least one sliding portion comprises a first sliding member and a second sliding member, the first sliding member is separated from the second sliding member by a predetermined interval in the predetermined direction; and
the guiding surface comprises a pair of inclined surfaces, configured such that each of the pair of the inclined surfaces guides one of the first and the second sliding members.

10. The image reading apparatus according to claim 8, wherein the guiding surface comprises a downwardly protruding curved surface.

11. The image reading apparatus according to claim 8, wherein the at least one sliding portion comprises a rotating member.

12. The image reading apparatus according to claim 8, wherein the at least one sliding portion comprises a protruding portion having a substantially low friction coefficient.

* * * * *